United States Patent [19]

Wilson

[11] Patent Number: 5,059,845
[45] Date of Patent: Oct. 22, 1991

[54] ACTIVE MAGNETIC BEARING DEVICE FOR CONTROLLING ROTOR VIBRATIONS

[75] Inventor: Donald S. Wilson, Clifton Park, N.Y.

[73] Assignee: Mechanical Technology Incorporated, Latham, N.Y.

[21] Appl. No.: 521,158

[22] Filed: May 7, 1990

[51] Int. Cl.⁵ .............................................. H02K 7/09
[52] U.S. Cl. .................................... 310/90.5; 310/90
[58] Field of Search ..................... 310/90.5, 51, 90; 384/12, 133, 906

[56] References Cited

U.S. PATENT DOCUMENTS

| | | | |
|---|---|---|---|
| 3,978,440 | 8/1976 | Prouty et al. | 335/186 |
| 4,471,253 | 9/1984 | Laing | 310/217 |
| 4,513,215 | 4/1985 | Del Serra | 310/90 |
| 4,521,708 | 6/1985 | Vandevier | 310/87 |
| 4,641,978 | 2/1987 | Kapich | 384/102 |
| 4,696,581 | 9/1987 | Tsushima et al. | 384/565 |
| 4,705,990 | 11/1987 | Agoston et al. | 315/39.55 |
| 4,790,673 | 12/1988 | Simmons | 384/147 |
| 4,794,290 | 12/1988 | Nagasaka | 310/90.5 |
| 4,834,560 | 5/1989 | Jacob et al. | 384/461 |
| 4,839,550 | 6/1989 | Mizuno et al. | 310/90.5 |
| 4,866,318 | 9/1989 | Habermann et al. | 310/90.5 |

Primary Examiner—R. Skudy
Assistant Examiner—Edward H. To
Attorney, Agent, or Firm—Joseph V. Claeys; Joseph C. Sullivan

[57] ABSTRACT

The present invention relates to a system employing an active magnetic bearing for controlling and isolating rotor vibrations. The invention includes an active magnetic bearing having a stator, an armature and an inner bearing located within the central bore of the armature. The active magnetic bearing has dynamic stiffness sufficiently low with respect to the inner bearing so that the inner bearing tracks shaft motion in an oscillatory manner while magnetically suspended during flotation of the active magnetic bearing. The inner bearing can be either a fluid film bearing or a rolling element bearing. The system allows for continued operation in the event of failure of the active magnetic bearing.

12 Claims, 4 Drawing Sheets

ACTIVE MAGNETIC BEARING DEVICE FOR CONTROLLING ROTOR VIBRATIONS

BACKGROUND OF THE INVENTION

1. Field of the Invention

The present invention relates to a device for controlling rotor vibration. In particular, the present invention relates to a device utilizing active magnetic bearings to control and isolate rotor vibrations from the housing and its mountings.

2. Background of the Prior Art

It is well known in the art to support a rotating shaft using electromagnetic coils with an active feedback system. The obvious advantage of such a system is the elimination of a lubricant or lubrication system. Another advantage is the ability to control the stiffness and damping support characteristics which in turn permits controlling the vibrational characteristics of the rotor. In certain applications, the ability to control and isolate rotor vibrations is more important than eliminating a lubrication system or lubricants.

One problem in using active magnetic bearings is preventing a catastrophic failure due to a control system malfunction. If the control system malfunctions, the rotating member of the active magnetic bearing would make contact with the electromagnetic stator resulting in severe damage. One way to avoid such damage is by using a "catcher" or an auxiliary bearing to catch the rotor before contact is made either between the clearance type seals or the magnetic bearings themselves.

Accordingly, an active magnetic bearing is typically protected by an auxiliary bearing. However, auxiliary bearings usually suffer from a short lifetime and are used to support the rotor until they stop. Oil type sleeve bearings are not employed as auxiliary bearings since there is insufficient time to activate an oil supply system and to supply the oil during an active magnetic bearing failure Rolling element bearings are most often used as the "catcher" or auxiliary bearing. These bearings have a clearance between the shaft and bore to prevent contact during operation of the active magnetic bearing. When the active magnetic bearing fails, the shaft drops onto the bore of the auxiliary bearing inducing skidding of the rolling element and reducing life due to the loose bore. If the rotor is highly unbalanced, a violent whirl can occur resulting in even greater associated damage.

SUMMARY OF THE INVENTION

Hence with the foregoing in mind, it is a principal object of the invention to provide a control device employing an active magnetic bearing that avoids the drawbacks of the aforementioned prior art proposals.

It is a further object of the invention to provide a control device employing an active magnetic bearing for controlling and isolating rotor vibrations which utilizes an original bearing support and lubrication systems.

In order to implement these and other objects of the invention, which will become more readily apparent as the description proceeds, the present invention provides an active magnetic bearing device for controlling rotor vibrations comprising an active magnetic bearing including a stator and an armature assembly including an inner bearing located within the central bore of the armature and wherein the active magnetic bearing has a dynamic stiffness sufficiently low with respect to the inner bearing that the inner bearing tracks shaft motion in an oscillatory manner while magnetically suspended during flotation of said active magnetic bearing. The arrangement allows for continued operation in the event of failure of the active magnetic bearing.

DETAILED DESCRIPTION OF THE PREFERRED EMBODIMENTS

Figure 1A:
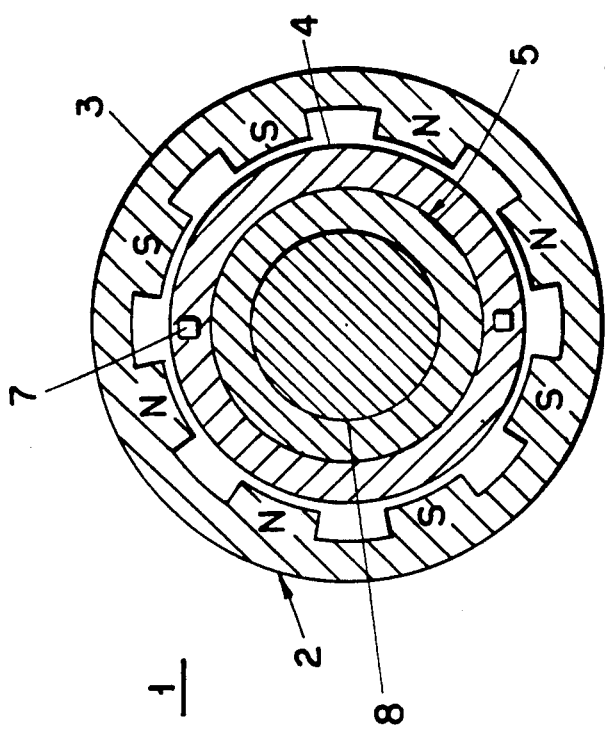
FIG. 1A is a sectional front view of FIG. 1B showing a first embodiment of the invention.
Figure 1B:
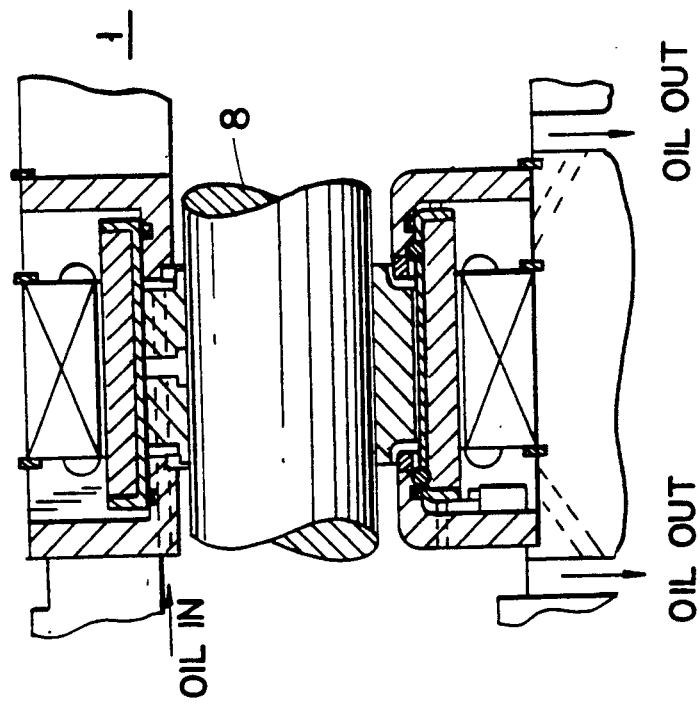
FIG. 1B is a sectional side view of FIG. 1A.
Figure 1C:
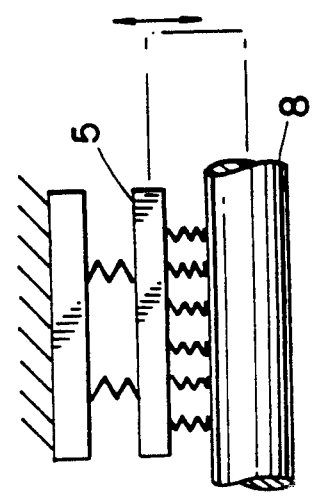
FIG. 1C shows the invention of FIGS. 1A and 1B with the shaft and inner bearing vibrating together during activation of the active magnetic bearing.

Referring now to the drawings, FIGS. 1A-1C show a first embodiment of the invention in which an active magnetic bearing device 1 comprises an active magnetic bearing 2 including a stator 3, and an armature 4 preferably formed of a plurality of laminations. The stator 3 is located around the armature 4 with provision for a suitable magnetic air gap.

An inner bearing 5 is installed in the central bore of the armature 4 for supporting a shaft 8 for rotation as shown in FIG. 1A. The inner bearing 5 can either be an oil film bearing (FIGS. 1A and 1B) or a rolling element bearing (FIG. 1C). The inner bearing 5 and the armature assembly have a small clearance to ground before contacting the housing as shown more clearly in FIGS. 2A and 2B. The clearance is about 10 to 15 percent of the magnetic air gap.

As seen in FIG. 1A, shaft 8 is supported for rotation in the fluid bearing 5 which in turn is supported in the active magnetic bearing 2.

A small axial clearance to ground is provided to permit the bearing armature assembly to float freely in a magnetic field when the active magnetic bearing 2 is operative.

An anti-rotation device 7 prevents the armature assembly from rotating when the active magnetic bearing 2 is set sufficiently low (by the control system) relative to the fluid film bearing or rolling element bearing so that the inner bearing 5 follows and tracks shaft motion in an oscillatory fashion while suspended in the magnetic field. The magnetic bearing 2, being sufficiently soft, does not track shaft motion and as a result attenuates forces to ground.

FIG. 2 shows a second embodiment of the present invention having a horizontally split housing 201 suitable for housing an active magnetic bearing device with a horizontal shaft 208 supported for rotation therein. The bearing assembly includes opposed sets of horizontal electromagnetic poles 202 and a vertical set of electromagnetic poles 202'. Thus, there is no opposing set of vertical poles. This arrangement reduces the vertical dynamic magnetic stiffness as compared to an arrangement with opposing vertical poles, which is a desired result. Both the active magnetic bearing stator 203 and armature 204 are formed in the shape of a horseshoe. The arrangement allows for easy assembly and disassembly.

When the active magnetic bearing is not activated or operational, a bearing saddle 207 sits on the lower bearing housing. When the active magnetic bearing is activated, the bearing saddle 207 lifts off the housing having clearance in the vertical and horizontal directions and is completely free to follow vibratory motions of the shaft. The horizontal electromagnetic poles 202 are slightly displaced between the left side and the right side of the stator, to create a moment force, which prevents rotation of the assembly from the frictional drag force in the fluid film bearing.

Figure 2A:
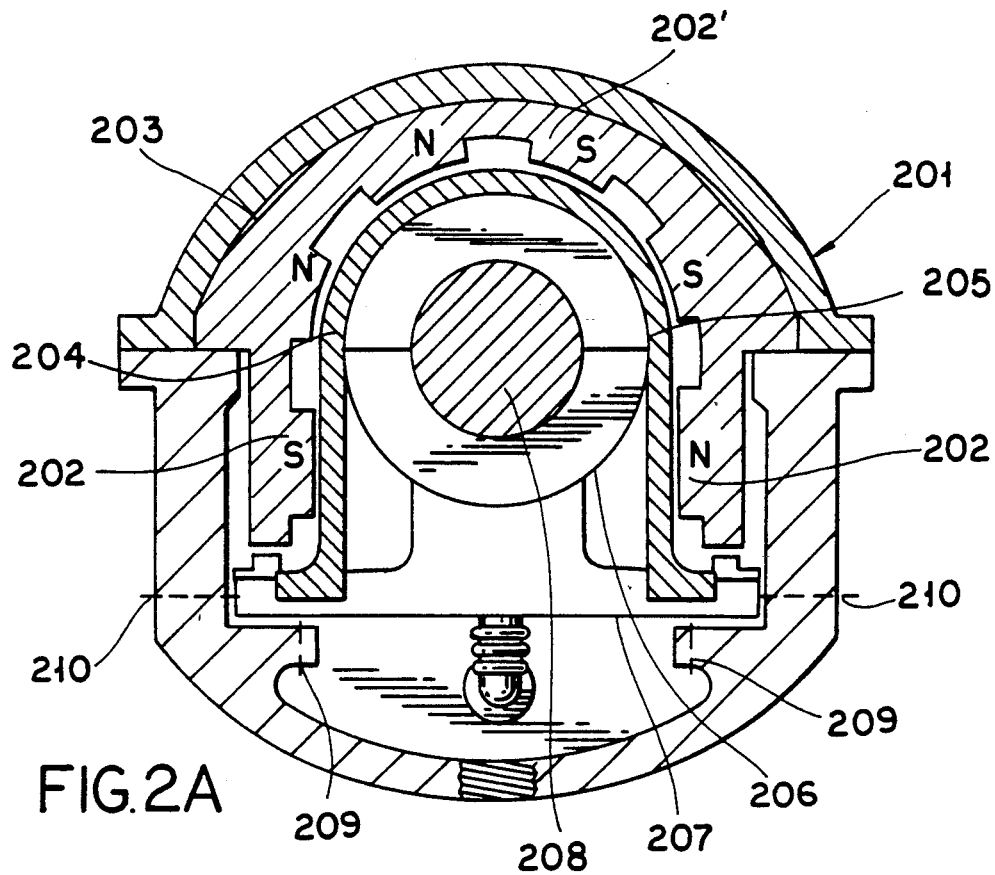
FIG. 2A is a sectional front view of FIG. 2B showing a second embodiment of the invention.
Figure 2B:
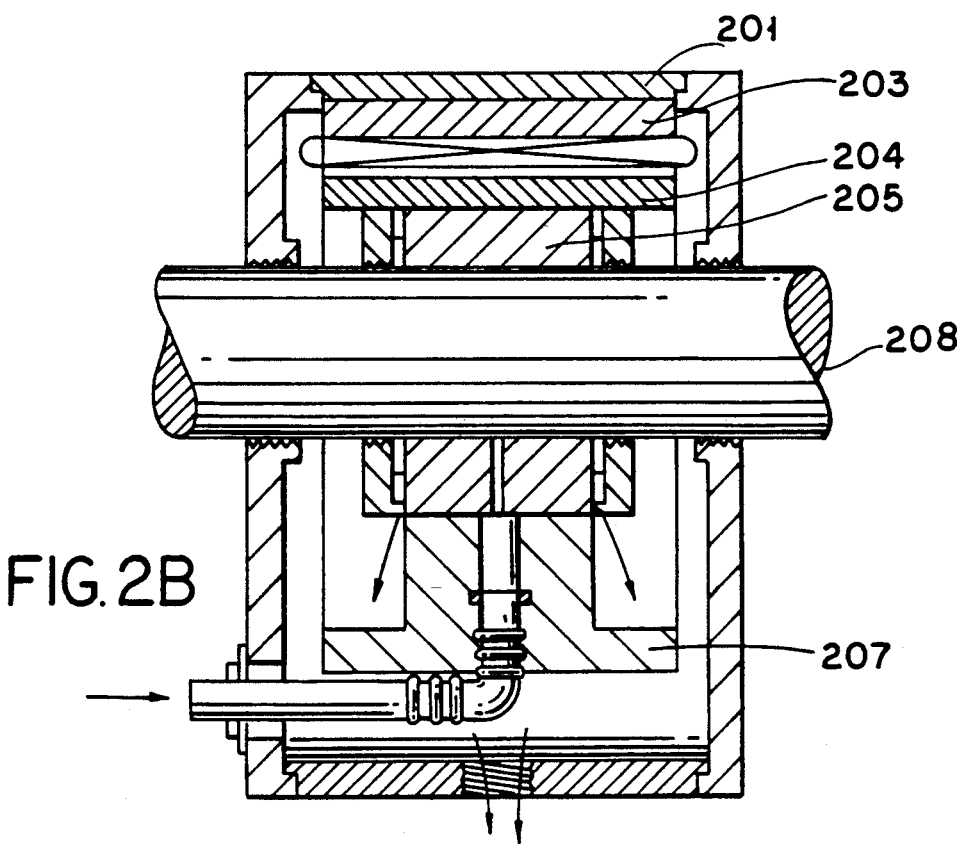
FIG. 2B is a sectional side view of FIG. 2A.

As is conventional with active magnetic bearings, sensor and control electronics for each axis of the active magnetic bearing are employed in well known manner to provide stable control of the active magnetic bearing winding currents to center the bearing armature in the bearing stator under all operating conditions of the active magnetic bearing. To this end, position sensor probes are provided for sensing displacements of the armature in two directions from a normal centered position and the signals from such sensors are processed in well known manner by suitable control electronics to control the position of the armature within the stator. In FIG. 2A for example, two vertical position sensor probes 209 are provided for sensing the vertical position of the armature 204. One of the position sensor probes is located in the left plane and the other is located in the right plane. The position sensor probes 209 are connected in a push-pull arrangement and their signals are applied to a conventional control system which is operative to control the current to the coils of the vertical set of poles 202' for vertical positioning of the armature in well known manner. Two horizontal position sensor probes 210 are provided to sense the horizontal position of the armature 204. Position sensor probes 210 are disposed 90 degrees from the vertical position sensor probes 209, are similarly connected in a push-pull arrangement, and their signals applied to the control system to control the current to the coils of the horizontal sets of poles 202 for horizontal positioning of the armature in well known manner.

Figure 3C:
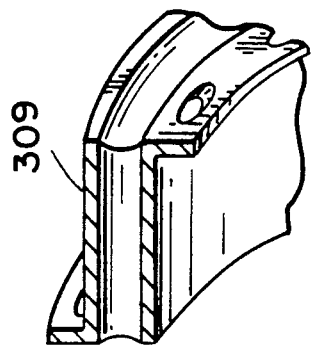
FIGS. 3B and 3C are partial perspective views of the flexible elements connecting the bearing to the can and the stationary housing in the embodiment of FIG. 3A.
Figure 3B:
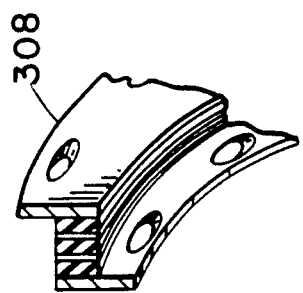
Figure 3A:
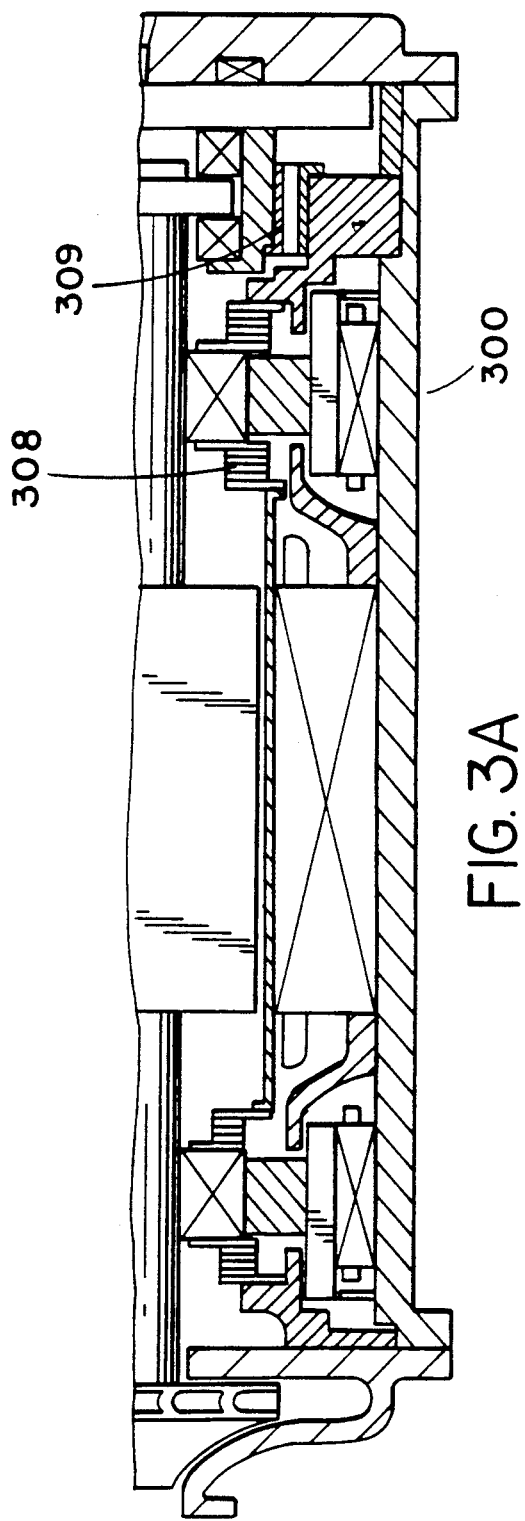
FIG. 3A is a sectional side view of a third embodiment of the invention.

A third embodiment of the invention is for a combined fluid film bearing and active magnetic bearing for use in a sealed motor is shown in FIG. 3. In this arrangement, the motor rotor and bearings are sealed in a thin wall can 300. The bearing housing is connected to the thin wall can 300 and the stationary housing through flexible elements 308, 309 such as a rubber-steel laminated ring 308 shown in FIG. 3. The ring 308 provides high axial stiffness but low radial stiffness and provides a seal between the inner can and the outer environment. This embodiment is useful in motor driven pumps where the pumping fluid fills the sealed can 300 and provides the lubricant for the inner bearing and also prevents ingress of fluid to the active magnetic bearing.

Figure 4:
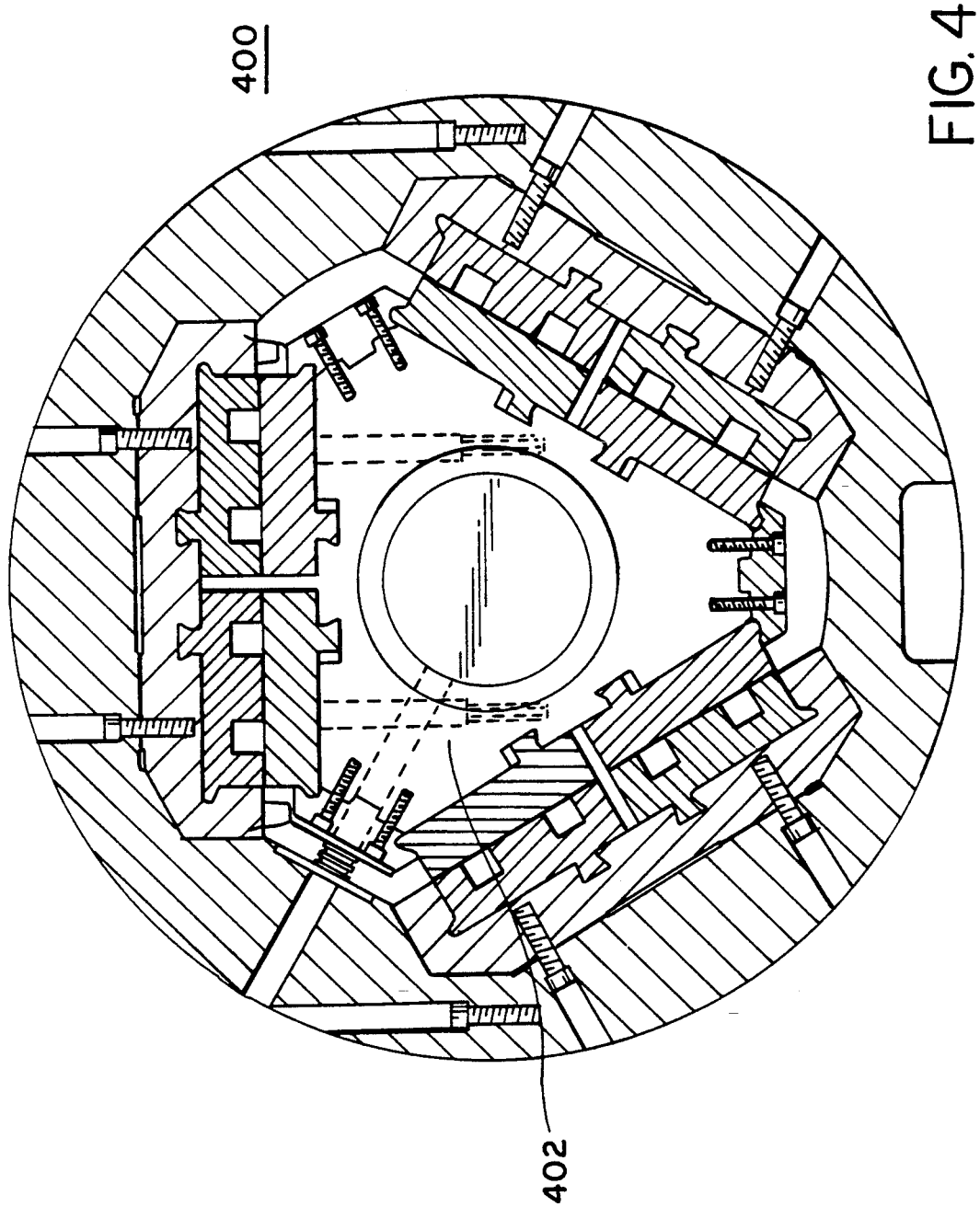
FIG. 4 shows a fourth embodiment of the invention.

FIG. 4 shows a fourth embodiment in which the invention has a triangular configuration for the active magnetic bearing device 400.

In this configuration, the inner oil bearing is mounted within the triangular moving armature of the active magnetic bearing. The laminated stator and armature are rectangular rather than circular, simplifying fabrication. This is surrounded by a stationary triangular electromagnet 402. The arrangement offers some distinct advantages including improving the static load capacity, less restriction for oil drainage from the internal fluid bearing, and anti-rotation is accomplished magnetically rather than by means of a mechanical stop.

Obviously numerous modifications may be made to the present invention without departing from its scope as defined in the appended claims.

I claim:

1. An active magnetic bearing device for controlling rotor vibration, comprising:
    an active magnetic bearing including a stator and an armature assembly, said armature assembly having a central bore and an inner bearing therein for supporting a rotating shaft, said stator being adapted to fit around said armature assembly;
    means for inhibiting rotation between said stator and said armature assembly; and
    said active magnetic bearing having a dynamic stiffness sufficient with respect to said inner bearing so that said inner bearing tracks shaft motion in an oscillatory manner while magnetically suspended during flotation of said active magnetic bearing and said active magnetic bearing attenuates forces thereon.

2. An active magnetic bearing device according to claim 1, wherein said inner bearing is an oil film bearing.

3. An active magnetic bearing device according to claim 1, wherein said inner bearing is a rolling element bearing.

4. An active magnetic bearing device according to claim 1, further comprising a magnetic air gap between said stator and said armature assembly and wherein said inner bearing and said armature assembly have a small clearance of 10 to 15 percent of said magnetic air gap.

5. An active magnetic bearing assembly according to claim 1, wherein said armature assembly is provided with a small axial clearance so that said armature assembly floats freely in a magnetic field during operation of said active magnetic bearing.

6. An active magnetic bearing assembly according to claim 1 wherein said means for inhibiting rotation comprises an opening in said armature assembly and an anti-rotation device adapted to be disposed loosely within said opening in said armature assembly to prevent rotation of said armature assembly during flotation of the assembly by said active magnetic bearing.

7. An active magnetic bearing device adapted to support a shaft and for controlling rotor vibration, comprising:
    a split housing adapted to house said magnetic bearing device with said shaft therein;
    an active magnetic bearing having a horseshoe shaped stator and a non-rotating horseshoe shaped armature;
    a rotor bearing assembly;
    a vertical set of electromagnetic poles and opposed sets of horizontal electromagnetic poles adapted to suspend said rotor bearing assembly;
    a fluid film bearing having a horizontal split fluid film bearing cap;
    a bearing saddle upon which said fluid film bearing rests during non-operation of said active magnetic bearing device; and
    a lower bearing housing upon which said bearing saddle rests to provide for continued operation when said active magnetic bearing device is inactive and so that when said active magnetic bearing device is activated said bearing saddle is lifted off of said lower bearing housing having clearance in both vertical and horizontal directions to freely follow vibratory motion of said shaft.

8. An active magnetic bearing device according to claim 7, wherein said horizontal electromagnetic poles are displaced slightly between left and right sides of said stator to create a moment force which prevents rotation of said rotor bearing assembly due to a frictional drag force in said fluid film bearing.

9. An active magnetic bearing device according to claim 7;
wherein said vertical set of poles includes first magnetic coils and said horizontal set of poles includes second magnetic coils;
wherein said active magnetic device further comprises:
a control system,
two horizontal probes connected in a push pull arrangement to provide armature position signals to said control system, and
two vertical probes disposed 90° from said horizontal probes connected in a push pull arrangement to provide armature position signals to said control system,
wherein said signals from said horizontal and vertical probes are supplied to said control system so that said control system controls current to said first coils and second coils to control the position of said armature.

10. An active magnetic bearing device according to claim 1, wherein said active magnetic device is secured in a thin walled sealed can and said inner bearing is a fluid film bearing having a housing connected to said sealed can by flexible connecting means to prevent ingress of fluid to said active magnetic bearings.

11. An active magnetic bearing device according to claim 10, wherein said flexible connecting means is a rubber and steel laminated ring an axial stiffness substantially higher than a radial stiffness thereof.

12. An active magnetic bearing device according to claim 1, wherein said stator and said armature are rectangularly shaped and arranged in a triangular configuration about said shaft so that said device is surrounded by stationary triangular electromagnets and said inner bearing is mounted within said triangular armature thereby improving stator load capacity and preventing rotation of said armature magnetically during flotation of said assembly by said device.

* * * * *